US008525463B2

(12) United States Patent
Hioka et al.

(10) Patent No.: US 8,525,463 B2
(45) Date of Patent: Sep. 3, 2013

(54) MALFUNCTION DETERMINATION DEVICE FOR MOTOR CONTROL SYSTEM

(75) Inventors: Eiichi Hioka, Toyota (JP); Takashi Nakagawa, Toyota (JP); Masahiro Ito, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 589 days.

(21) Appl. No.: 12/720,077

(22) Filed: Mar. 9, 2010

(65) Prior Publication Data
US 2010/0270963 A1  Oct. 28, 2010

(30) Foreign Application Priority Data

Apr. 27, 2009 (JP) ................................. 2009-108020

(51) Int. Cl.
*H02H 7/097* (2006.01)
*F02D 41/22* (2006.01)
*F01L 1/34* (2006.01)

(52) U.S. Cl.
USPC .............. 318/490; 318/13; 318/565; 388/909

(58) Field of Classification Search
USPC ............... 318/8–15, 490, 565, 600, 601, 604, 318/671; 388/903, 909
See application file for complete search history.

(56) References Cited

U.S. PATENT DOCUMENTS

| 4,484,119 A | * | 11/1984 | Kerr .............................. 318/563 |
| 5,210,476 A | * | 5/1993 | Kazato .......................... 318/560 |
| 5,319,513 A | * | 6/1994 | Lowenstein et al. .......... 361/113 |
| 6,492,804 B2 | | 12/2002 | Tsuge et al. |
| 6,691,690 B2 | | 2/2004 | Shin |
| 7,156,083 B2 | | 1/2007 | Nakamura |
| 2009/0101094 A1 | | 4/2009 | Mashiki et al. |
| 2010/0295491 A1 | * | 11/2010 | Schulz et al. ................. 318/490 |

FOREIGN PATENT DOCUMENTS

| JP | 58215560 A | 12/1983 |
| JP | 61132094 A | 6/1986 |
| JP | 08234841 A | 9/1996 |
| JP | 11018479 A | 1/1999 |

(Continued)

OTHER PUBLICATIONS

Office action issued Jan. 18, 2011 for Japanese Patent Application No. 2009-108020 and partial English language translation thereof.

(Continued)

*Primary Examiner* — Bentsu Ro
(74) *Attorney, Agent, or Firm* — Gifford, Krass, Sprinkle, Anderson & Citkowski, P.C.

(57) ABSTRACT

A malfunction determination device for a motor control system, outputs a position signal that indicates a moved position of a movable member of a motor and a direction signal that indicates a movement direction of the movable member. The malfunction determination device determines a malfunction has occurred if a relationship between the position signal and the direction signal differs from that when the motor control system is operating normally. The malfunction determination device outputs a pulse signal that varies periodically along with variations in the moved position of the movable member as the position signal; outputs a periodic pulse signal in the same phase with the position signal as the direction signal if the movable member is moving in one direction; and outputs a periodic pulse signal in an opposite phase to the position signal as the direction signal if the movable member is moving in the other direction.

8 Claims, 4 Drawing Sheets

(56) References Cited

FOREIGN PATENT DOCUMENTS

| | | |
|---|---|---|
| JP | 2000356466 A | 12/2000 |
| JP | 2001165951 A | 6/2001 |
| JP | 2003083146 A | 3/2003 |
| JP | 2006226226 A | 8/2006 |
| JP | 2008057455 A | 3/2008 |

OTHER PUBLICATIONS

Office action issued May 31, 2011 for Japanese Patent Application No. 2009-108020 and partial English language translation thereof.

* cited by examiner

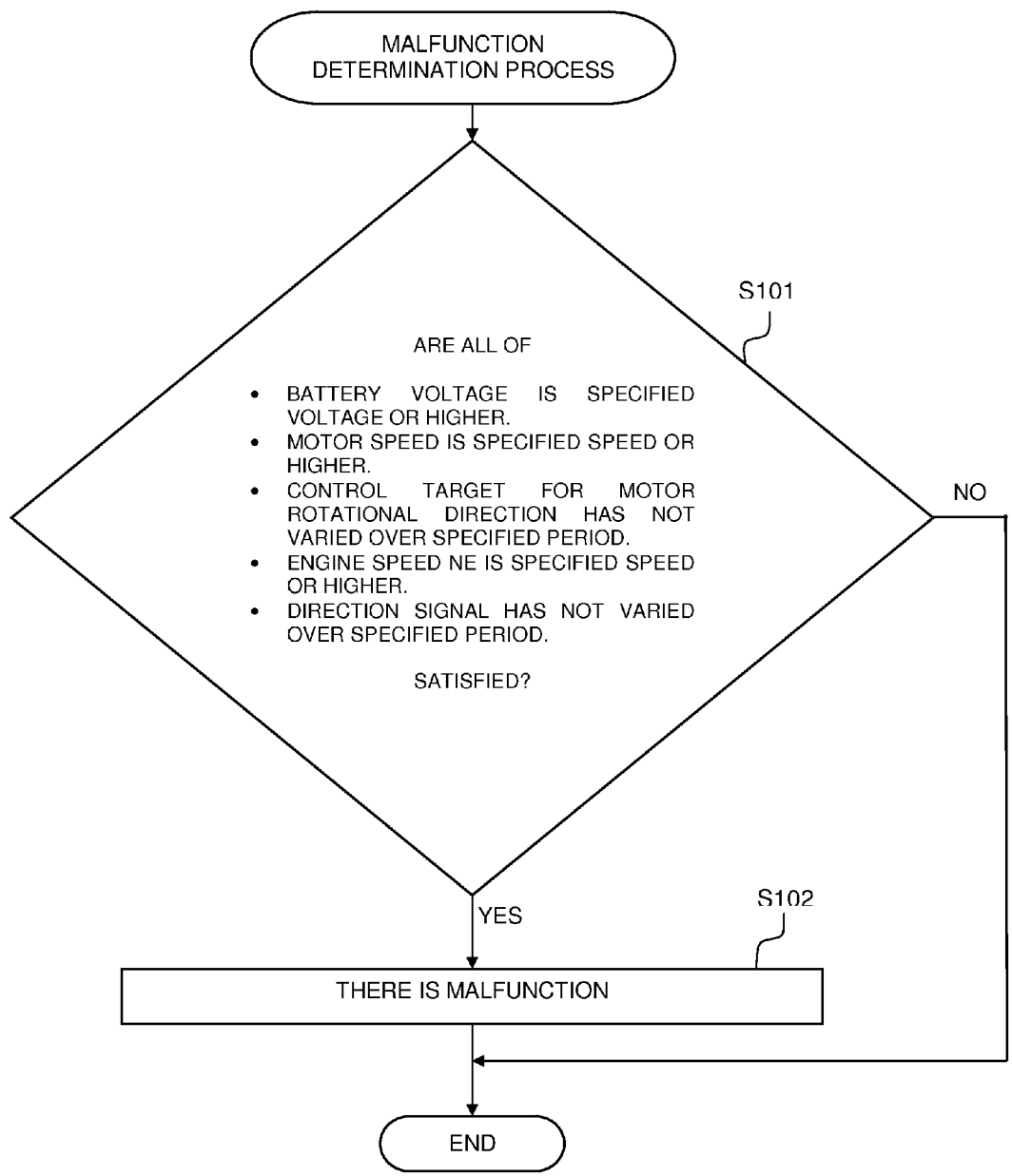

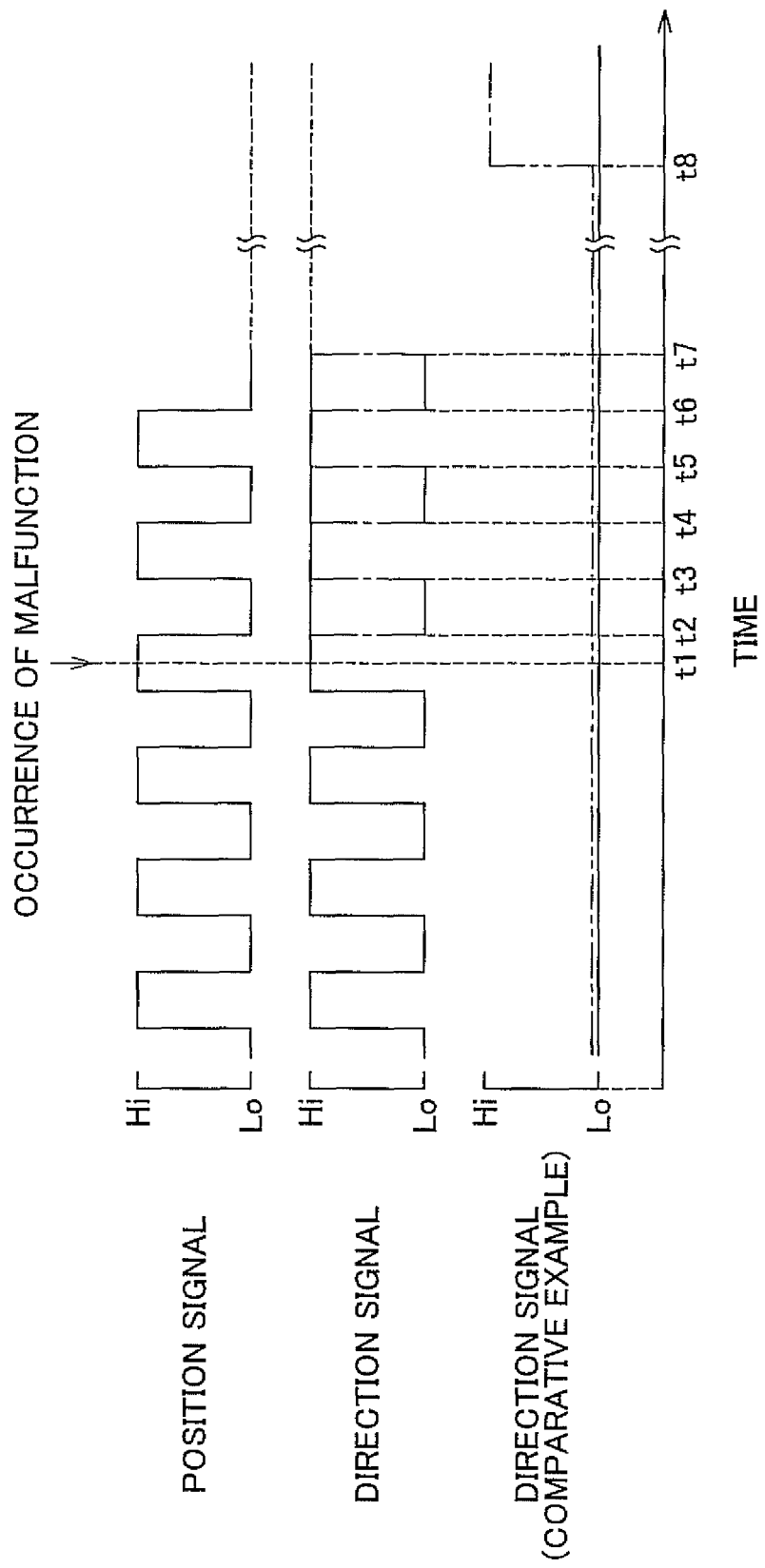

MALFUNCTION DETERMINATION DEVICE FOR MOTOR CONTROL SYSTEM

INCORPORATION BY REFERENCE

The disclosure of Japanese Patent Application No. 2009-108020 filed on Apr. 27, 2009 including the specification, drawings and abstract is incorporated herein by reference in its entirety.

BACKGROUND OF THE INVENTION

1. Field of the Invention

The present invention relates to a malfunction determination device for a motor control system that controls the operation of a motor.

2. Description of the Related Art

In recent years, motor control systems that include a state detection system that outputs a signal corresponding to the operation state of a motor to execute operation control of the motor based on an output signal of the state detection system are widely used.

Some conventional systems use a signal corresponding to the rotational phase of an output shaft of a motor which serves as an electric motor (for example, a pulse signal that varies periodically along with rotation of the motor output shaft) as the output signal of the state detection system. The rotational speed and the rotational phase of the output shaft of the motor may be determined by monitoring the output signal.

Japanese Patent Application Publication No. 2006-226226 (JP-A-2006-226226), for example, describes a system that uses a signal that indicates the rotational direction of an output shaft of a motor as the output signal. The system according to JP-A-2006-226226 outputs, as the signal that indicates the rotational direction of the motor output shaft, a Lo signal when the output shaft is rotating in the forward direction and a Hi signal when the output shaft is rotating in the reverse direction. The rotational direction of the motor output shaft (forward direction or reverse direction) may be determined by monitoring the output signal.

If a malfunction occurs in the motor control system, it is desirable to immediately determine that a malfunction has occurred and to change the operation control of the motor to a mode appropriate for such an occurrence. When a malfunction occurs in the motor control system (in a malfunction condition), the output signal of the state detection system often varies differently than when no malfunction occurs in the motor control system (in a normal condition). This makes it possible to determine that a malfunction has occurred in the motor control system based on the fact that the output signal varies differently from that at normal times.

However, in a system that only outputs either a Lo signal or a Hi signal in accordance with the rotational direction of the motor output shaft, the rotational direction of the motor output shaft indicated by the signal may match the actual rotational direction of the motor output shaft if a malfunction occurs that does not cause the Hi signal or Lo signal to vary from the rotational direction of the motor output shaft. At this time, even if a malfunction has occurred in the motor control system, the output signal of the state detection system happens to vary in the same manner as under normal operation. In this case, therefore, it is not possible to properly determine that a malfunction has occurred based only on the output signal of the state detection system.

Such inconveniences in detecting malfunctions discussed above occur not only in motor control systems that execute operation control of an electric motor but also in motor control systems that execute operation control of a linear motor with a reciprocally movable member, such as a plunger, for example.

SUMMARY OF THE INVENTION

The present invention provides a malfunction determination device for a motor control system that can determine the occurrence of a malfunction with high precision.

A first aspect of the present invention provides a malfunction determination device for a motor control system that includes a position signal output section that outputs a position signal that indicates a moved position of a movable member of a motor and a direction signal output section that outputs a direction signal that indicates a movement direction of the movable member to execute operation control of the motor, the malfunction determination device including: a malfunction determination section that determines a malfunction has occurred if a relationship between the position signal and the direction signal differs from that when no malfunction has occurred in the motor control system, wherein: the position signal output section outputs a pulse signal that varies periodically along with variations in the moved position of the movable member as the position signal, the direction signal output section outputs a periodic pulse signal in the same phase with the position signal as the direction signal if the movable member is moving in one of a forward direction and a reverse direction, and the direction signal output section outputs a periodic pulse signal in an opposite phase to the position signal as the direction signal if the movable member is moving in the other of the forward direction and the reverse direction.

In the configuration described above, when a malfunction in which the direction signal that indicates the movement direction of the movable member of the motor does not vary from a fixed value (a Hi signal or a Lo signal) occurs (in a malfunction condition), the pattern of variation in the direction signal is clearly different from that with no occurrence of a malfunction (in a normal condition) (specifically, a pulse signal that varies periodically). Therefore, the relationship between the position signal that indicates the movement position of the motor and the direction signal when a malfunction has occurred is also clearly different from that under normal operation. Thus, according to the configuration described above, the relationship between the position signal and the direction signal when a malfunction has occurred is clearly different from that under normal operation. This makes it possible to determine that a malfunction has occurred with high precision based on the difference in the relationship.

A second aspect of the present invention provides a malfunction determination device for a motor control system that includes position signal output means for outputting a position signal that indicates a moved position of a movable member of a motor and direction signal output means for outputting a direction signal that indicates a movement direction of the movable member to execute operation control of the motor, the malfunction determination device including: malfunction determination means for determining a malfunction has occurred if a relationship between the position signal and the direction signal differs from that when no malfunction has occurred in the motor control system, wherein: the position signal output means outputs a pulse signal that varies periodically along with variations in the moved position of the movable member as the position signal, the direction signal output means outputs a periodic pulse signal in the same phase with the position signal as the direction signal if the movable member is moving in one of a forward direction and a reverse direction, and the direction signal output means outputs a periodic pulse signal in an opposite phase to the position signal as the direction signal if the movable member is moving in the other of the forward direction and the reverse direction.

A third aspect of the present invention provides a malfunction determination method for a motor control system that executes operation control of a motor, the method including: outputting, as a position signal that indicates a moved position of a movable member of the motor, a pulse signal that varies periodically along with variations in the moved position of the movable member; outputting a periodic pulse signal in the same phase with the position signal as a direction signal that indicates a movement direction of the movable member if the movable member is moving in one of a forward direction and a reverse direction; outputting a periodic pulse signal in an opposite phase to the position signal as the direction signal that indicates the movement direction of the movable member if the movable member is moving in the other of the forward direction and the reverse direction; and determining that a malfunction has occurred if a relationship between the position signal and the direction signal differs from that when no malfunction has occurred in the motor control system.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is a flowchart that shows the specific operations of a malfunction determining process according to the embodiment of the present invention; and FIG. 4 is a timing chart that shows the manner of variations in the position signal and the direction signal according to the embodiment of the present invention.

DETAILED DESCRIPTION OF EMBODIMENTS

Figure 1:
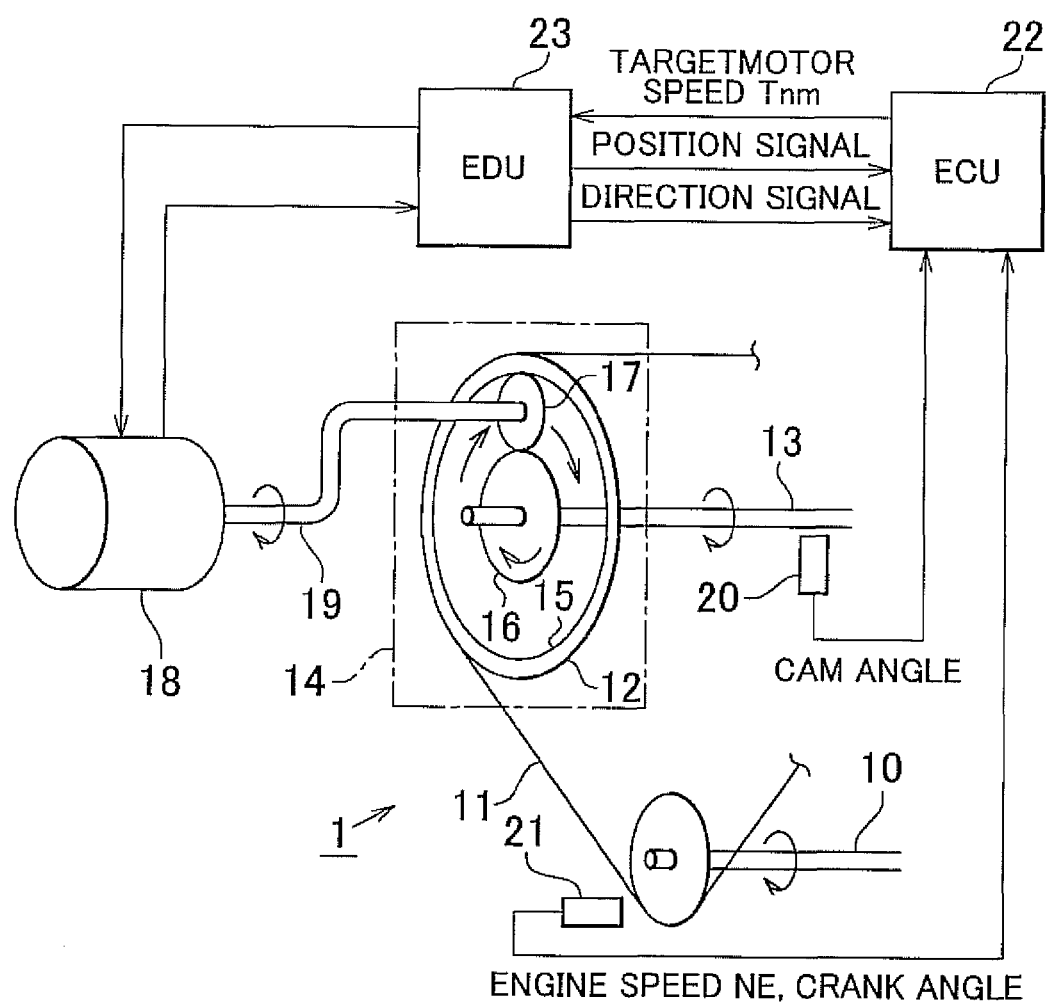
FIG. 1 shows a schematic configuration of a motor control system to which a malfunction determination device according to an embodiment of the present invention is applied.

An malfunction determination device for a motor control system according to an embodiment of the present invention will be described below. FIG. 1 shows a schematic configuration of a motor control system that includes a malfunction determination device according to the embodiment.

As shown in FIG. 1, a crankshaft 10 of an internal combustion engine 1 is coupled to a camshaft 13 via a timing chain (or a timing belt) 11 and a cam sprocket 12. Cams that drive engine valves to open and close are provided on the camshaft 13. A variable valve timing mechanism 14 is provided between the cam sprocket 12 and the camshaft 13. A cam sensor 20 that detects the rotational phase (cam angle) of the camshaft 13 is provided in the near the camshaft 13. A crank sensor 21 that detects the rotational phase (crank angle) and the rotational speed (engine speed NE) of the crankshaft 10 is provided in the near the crankshaft 10.

The variable valve timing mechanism 14 includes an outer gear 15 with internal teeth that is disposed coaxially with the camshaft 13, an inner gear 16 with external teeth that is coaxially disposed within the outer gear 15, and a planetary gear 17 that is provided between and in mesh with the outer gear 15 and the inner gear 16.

The outer gear 15 is rotatable together with the cam sprocket 12, which rotates synchronously with the crankshaft 10. The inner gear 16 is rotatable together with the camshaft 13. The planetary gear 17 revolves around the inner gear 16 in a circular orbit while being meshed with the outer gear 15 and the inner gear 16 to transmit a rotational force of the outer gear 15 to the inner gear 16. The respective numbers of teeth of the outer gear 15, the inner gear 16, and the planetary gear 17 are set such that the camshaft 13 is driven at half the rotational speed of crankshaft 10 (engine speed NE).

In the embodiment, the rotational phase of the inner gear 16 with respect to the rotational phase of the outer gear 15 is adjusted by varying the turning speed (revolution speed) of the planetary gear 17 with respect to the rotational speed of the inner gear 16 (which is equal to the rotational speed of the camshaft 13).

The internal combustion engine 1 includes a motor 18 which serves as an electric motor that varies the turning speed of the planetary gear 17. An output shaft 19 of the motor 18 is disposed coaxially with the rotary axes of the camshaft 13, the outer gear 15, and the inner gear 16, and coupled to a support shaft of the planetary gear 17 so as to be rotatable together. Along with rotation of the output shaft 19 of the motor 18, the planetary gear 17 turns (revolves) in a circular orbit on the outer circumference of the inner gear 16 while rotating about its support shaft.

In the above variable valve timing mechanism 14, to maintain a given valve timing (opening/closing timing) of the engine valves in the current state, the motor 18 is driven such that the movement speed of the output shaft 19 of the motor 18 (rotational speed of the motor 18, referred to as "motor speed" in the embodiment) matches the rotational speed of the camshaft 13. This causes the revolution speed of the planetary gear 17 to match the rotational speed of the outer gear 15 and the inner gear 16, maintaining the difference in the rotational phase between the outer gear 15 and the inner gear 16 and hence maintaining a given valve timing of the engine valves in the current state.

Meanwhile, when advancing the valve timing of the engine valves, the motor 18 is driven such that the motor speed becomes higher than the rotational speed of the inner gear 16. This causes the revolution speed of the planetary gear 17 to become higher than the rotational speed of the inner gear 16, advancing the rotational phase of the inner gear 16 with respect to the rotational phase of the outer gear 15 and hence the valve timing of the engine valves.

On the other hand, when retarding the valve timing of the engine valves, the motor 18 is driven such that the motor speed becomes lower than the rotational speed of the inner gear 16. This causes the revolution speed of the planetary gear 17 to become lower than the rotational speed of the inner gear 16, retarding the rotational phase of the inner gear 16 with respect to the rotational phase of the outer gear 15 and hence the valve timing of the engine valves.

Output signals of various sensors such as the cam sensor 20 and the crank sensor 21 are input to an electronic control unit (ECU) 22. The electronic control unit 22 is mainly formed by a microcomputer, and executes various control programs stored in its ROM to execute engine control such as control of the fuel injection amount and control of the ignition timing in accordance with the engine operation state.

The electronic control unit 22 computes the cam angle based on a detection signal of the cam sensor 20, computes the crank angle and the engine speed NE based on a detection signal of the crank sensor 21, and computes a control target value for the cam angle (target cam angle) in accordance with the engine operation conditions. The electronic control unit 22 then computes a control target value for the motor speed (target motor speed Tnm) based on the deviation between the target cam angle and the actual cam angle and the engine speed NE to output the target motor speed Tnm to a motor driving circuit (EDU) 23 provided integrally with the motor 18. In the embodiment, a value including a control target for the absolute value of the motor speed and a control target for the rotational direction of the output shaft 19 of the motor 18 is set as the target motor speed Tnm. Specifically, the target motor speed Tnm is set to a value with a larger absolute value as the control target for the absolute value of the motor speed is larger. Also, the target motor speed Tnm is set to a positive value when the control target for the rotational direction is the forward direction and to a negative value when the control target for the rotational direction is the reverse direction.

A plurality of sensors (not shown) that output a signal indicating the rotational phase of the output shaft 19 of the motor 18 are attached to the motor 18. Detection signals of the sensors are input to the motor driving circuit 23. The motor driving circuit 23 the calculates a rotational speed of the output shaft 19 of the motor 18 (actual motor speed NM) based on the input signals from the sensors, and performs feedback control of the power supplied to the motor 18 (specifically, the duty of the voltage applied to the motor 18) to reduce the deviation between the actual motor speed NM and the target motor speed Tnm. By feedback-controlling the actual motor speed NM to the target motor speed Tnm in this way, the cam angle is feedback-controlled to the target cam angle.

The motor driving circuit 23 also calculates the rotational phase and the rotational direction of the output shaft 19 of the motor 18 (motor rotational phase and motor rotational direction, respectively) based on the input signals from the plurality of sensors, and outputs a signal that indicates the motor rotational phase (position signal) and a signal that indicates the motor rotational direction (direction signal) to the electronic control unit 22.

Figure 2:
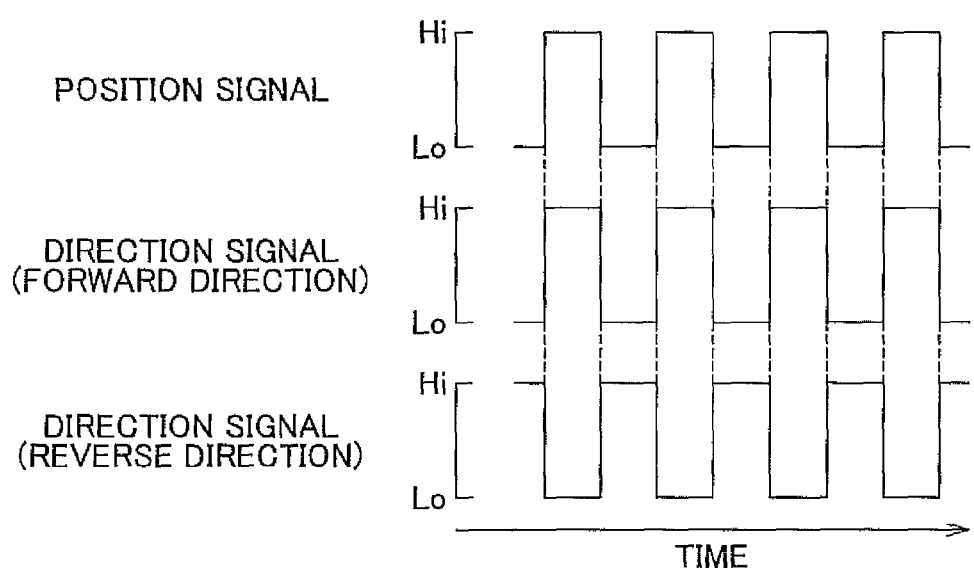
FIG. 2 is a time chart that shows the manner of variations in a position signal and a direction signal according to the embodiment of the present invention.

FIG. 2 shows an example of the variations in the position signal and the direction signal at the time when the output shaft 19 of the motor 18 is rotating at a constant speed. As shown in FIG. 2, a pulse signal that varies periodically along with variations in the motor rotational phase is output as the position signal. Specifically, a pulse signal is output each time the motor rotational phase varies by a specified phase. Meanwhile, a periodic pulse signal that varies in the same phase as the position signal is output as the direction signal when the output shaft 19 of the motor 18 rotates in the forward direction (the same direction as the rotational direction of the camshaft 13). In contrast, a periodic pulse signal in the opposite phase to the position signal is output as the direction signal when the output shaft 19 of the motor 18 rotates in the reverse direction. The motor speed may be estimated based on the position signal. The motor rotational direction can be estimated based on the relationship between the position signal and the direction signal. If the position signal and the direction signal are in the same phase as each other, it is determined that the motor is rotating in the forward direction. If the position signal and the direction signal are in opposite phases to each other, it is determined that the motor is rotating in the reverse direction.

When a malfunction occurs in the motor control system, it is desirable to determine that the malfunction has occurred immediately and to change the operation control of the motor 18 to a mode appropriate for such an occasion. If a malfunction occurs in the motor control system (in a malfunction condition), the output signal of the motor driving circuit 23 often varies differently than when no malfunction occurs (in a normal condition). Therefore, in this embodiment, it is determined that there is malfunction in the motor control system based on the fact that the output signal of the motor driving circuit 23 varies differently from that under normal operation, specifically based on the fact that the relationship between the position signal and the direction signal is different from that with no occurrence of a malfunction.

A process for determining whether a malfunction has occurred (malfunction determination process) will be described below with reference to FIG. 3. FIG. 3 is a flowchart that shows specific operations executed during the malfunction determination process. The sequence of operations shown in the flowchart is executed at specified periods as an interrupt process by the electronic control unit 22.

In the process, as shown in FIG. 3, it is first determined whether or not all of conditions A to E below are satisfied (step S101). Condition A is satisfied if the voltage of a battery (not shown) that supplies power to various electrical components equals or exceeds a specified voltage (for example, 11.0 volts for a device provided with a battery that has a rated voltage of 12.0 volts). Condition B is satisfied if the absolute value of the motor speed estimated based on an output signal (position signal) of the motor driving circuit 23 equals or exceeds a specified speed (for example, 100 rpm). Condition C is satisfied if the control target for the motor rotational direction has not varied over a specified period (for example, several hundreds of milliseconds). The control target is determined by the electronic control unit 22. For example, the control target is determined whether the target motor speed Tnm is set to a value corresponding to rotation in the forward direction or a value corresponding to rotation in the reverse direction. Condition D is satisfied if the engine speed NE equals or exceeds a specified speed (for example, 100 rpm). Condition E is satisfied if the direction signal input from the motor driving circuit 23 has not varied over a specified period. Specifically, the direction signal has not varied at the timing when the position signal input from the motor driving circuit 23 falls (or rises).

If all of the conditions A to E are satisfied (YES in step S101), it is determined that a malfunction has occurred in the motor control system (step S102), and the process ends. In this case, a warning lamp that is provided on an instrument panel is turned on through a process executed separately, for example, to inform the driver that a malfunction has occurred and to prompt the driver to have the motor control system checked or repaired.

However, if all of conditions A to E are not satisfied (NO in step S101), it is determined that a malfunction has not occurred in the motor control system, and the process ends.

The execution of the malfunction determination process described above will be described below. In the embodiment, as discussed earlier, periodic pulse signals in the same phase as each other are output as the position signal and the direction signal from the motor driving circuit 23 if the motor is rotating in the forward direction. On the other hand, periodic pulse signals in opposite phases to each other are output as the position signal and the direction signal if the motor is rotating in the reverse direction (see FIG. 2).

In the malfunction determination process, it is determined that if condition A is satisfied, sufficient power is supplied to the various electrical components, such as the motor 18, the electronic control unit 22, the motor driving circuit 23, and the various sensors. Also, it is determined that if conditions B and C are satisfied, then the motor 18 continues rotating in one direction. In addition, if condition D is satisfied it is determined that both the internal combustion engine 1 and the motor 18 are driven. Thus, it is possible to determined that both the position signal and the direction signal output from the motor driving circuit 23 and input to the electronic control unit 22 vary incessantly and periodically in pulses when the motor control system is operating normally when all of conditions A to D are satisfied.

FIG. 4 shows an example of variations in the position signal and the direction signal when all of conditions A to D are satisfied. As shown in FIG. 4, when the motor control system is operating normally (before time t1), both the position signal and the direction signal vary periodically in pulses along with variations in the motor rotational phase. Therefore, at this time, condition E is not satisfied in the malfunction determination process, and it is not determined that a malfunction has occurred.

In contrast, when an malfunction in which the direction signal does not vary from a fixed value (Hi signal or Lo signal) occurs in the motor control system (time t1), the manner of variation in the direction signal (indicated by the solid line) is clearly different from that under normal operation (indicated by the single-dashed line) thereafter (time t2 to t3, t4 to t5, t6 to t7). Therefore, the relationship between the position signal and the direction signal in the abnormal condition differs from that under normal operation. Therefore, the motor rotational direction, which is determined based on the position signal and the direction signal, does not match the control target for the motor rotational direction, which is determined by the electronic control unit 22.

If such a malfunction occurs, the direction signal, that is input from the motor driving circuit 23, and the control target for the motor rotational direction, which is determined by the electronic control unit 22, do not vary along with each other over a specified period (specifically, a period including the timing at which the position signal falls or rises) during rotation of the output shaft 19 of the motor 18. Therefore, at this time, in the malfunction determination process, condition E is satisfied (time t2), and it is determined that there is a malfunction has occurred in the motor control system.

In the malfunction determination process as described above, it is determined that the motor rotational direction, which is determined based on the position signal and the direction signal, and the control target for the motor rotational direction, do not match each other if all of conditions A to E are satisfied, in other words the relationship between the position signal and the direction signal differs from that under normal operation, and hence it is determined that a malfunction has occurred in the motor control system.

The above malfunction, in which the direction signal does not vary from a fixed value, occurs due to a break in a wire that connects the electronic control unit 22 to the motor driving circuit 23, for example, an malfunction in the motor driving circuit 23 itself, a malfunction in a sensor attached to the motor 18, and so forth.

In the motor control system according to the embodiment, when rotation of the output shaft 19 of the motor 18 stops, the direction signal and the position signal, which are output from the motor driving circuit 23, do not vary. Therefore, at this time, the malfunction determination based on the direction signal and position signal cannot be executed with high precision. In addition, when the motor speed is low, the number of variations in the direction signal and the position signal per unit time is small. Therefore, malfunction determination based on the direction signal and position signal cannot be performed appropriately because, for example, execution of such malfunction determination takes an unnecessarily long time. Further, of the motor speed is almost "0", a signal corresponding to rotation in the forward direction and a signal corresponding to rotation in the reverse direction may be output as the direction signal alternately at so high a frequency as to invite reduction in the precision of the malfunction determination.

In this respect, in the embodiment, the occurrence of a malfunction is determined if condition B is satisfied (i.e., that the absolute value of the motor speed is equal to or above a specified speed). Therefore, the occurrence of a malfunction may be determined only when the number of variations in the direction signal and the position signal per unit time is large and a value corresponding to one direction (forward direction or reverse direction) is continuously output as the direction signal. In addition, such a determination may be performed appropriately in a short time.

Incidentally, the variable valve timing mechanism 14 according to the embodiment changes the motor speed with respect to the rotational speed of the camshaft 13 to change the valve timing of the engine valves, and therefore the output shaft 19 of the motor 18 rotates in the forward direction in most circumstances. The output shaft 19 of the motor 18 rotates in the reverse direction only in rare occasions such as when the engine speed NE is low, for example, when the actual cam angle is advanced with respect to the target cam angle, or the deviation between the cam angle and the target cam angle is large. Therefore, it can be said that the motor 18 rotates in the reverse direction only in rare occasions in the case where a malfunction occurs in the motor control system. Thus, a device according to a comparative example which may determine that a malfunction has occurred at the timing when the actual motor rotational direction becomes the reverse direction after the occurrence of a malfunction may require a long time (time t1 to t8 in FIG. 4) from the occurrence of a malfunction to determine that a malfunction has occurred. The double-dashed line in FIG. 4 (comparative example) indicates the transition of the direction signal with the device according to the comparative example in a normal state.

In this respect, with the motor control system according to the embodiment, the occurrence of a malfunction may be determined immediately (time t2 in FIG. 4) in the manner discussed above without waiting for the actual motor rotational direction to be reversed even though the output shaft 19 of the motor 18 rotates in the reverse direction only on rare occasions.

According to the embodiment described above, the effects described below are obtained.

A pulse signal that varies periodically along with variations in the rotational phase of the output shaft 19 of the motor 18 is output as the position signal. A periodic pulse signal that varies in the same phase as the position signal is output as the direction signal when the output shaft 19 of the motor 18 rotates in the forward direction. A periodic pulse signal in the opposite phase to the position signal is output as the direction signal when the output shaft 19 of the motor 18 rotates in the reverse direction. Therefore, the pattern of variation in the direction signal when the motor control system is malfunctioning is clearly different from that under normal operation. Thus, the relationship between the position signal and the direction signal in the abnormal condition also clearly differs from that under normal operation. This makes it possible to determine that a malfunction has occurred with high precision based on such differences in the relationship.

It is possible to determine that the relationship between the position signal and the direction signal is different from that when no malfunction has occurred, based on the fact that the rotational direction of the motor that is determined based on the relationship between the position signal and the direction signal does not match the control target for the motor rotational direction.

It is possible to determine that the direction signal has not varied even though the output shaft 19 continues rotating in one direction, on if the direction signal and the control target for the direction signal have not varied along with each other over a specified period during rotation of the output shaft 19 of the motor 18. It is then possible to determine, based on the result of the above determination, that the motor rotational direction, which is determined based on the position signal and the direction signal, does not match the control target for the motor rotational direction.

If condition B is satisfied (i.e., the absolute value of the motor speed is equal to or above a specified speed), it is determined that a malfunction has occurred. Therefore, the occurrence of a malfunction may be determined appropriately in a short time only when the number of variations in the direction signal and the position signal per unit time is large and a value corresponding to one direction (forward direction or reverse direction) is continuously output as the direction signal.

It is possible to determine whether a malfunction has occurred immediately without having to wait for the actual motor rotational direction to become the reverse direction in a device in which the output shaft 19 of the motor 18 only rarely rotates in the reverse direction.

The above embodiment may be modified as described below.

Although it is determination of whether a malfunction has occurred in the motor control system based on satisfaction of all of conditions A to E in the above embodiment, condition A to condition E may be modified appropriately as long as it may be properly determined that the relationship between the position signal and the direction signal differs from that under normal operating conditions.

Specifically, condition A to condition D may be modified and/or omitted in any way if the occurrence of an malfunction is determined as long as the motor control system operates stably, for example. The occurrence of a malfunction may be determined regardless of the motor speed as long as the occurrence of a malfunction can be determined with high precision. That is, condition B may be omitted. An additional condition F may be set such that the motor rotational direction, which is determined based on the position signal and the direction signal, and the control target for the motor rotational direction do not match each other.

In the embodiment, the target motor speed Tnm is computed based on the deviation between the cam angle and the target cam angle and the engine speed NE. Accordingly, the cam angle is feedback-controlled to the target cam angle by feedback-controlling the power supplied to the motor 18 to reduce the deviation between the target motor speed Tnm and the actual motor speed NM. However, the cam angle may be feedback-controlled in any suitable manner. The malfunction determination device according to the present invention may also be applied to such motor control systems.

The present invention may also be applied to motor control systems that control motors provided for a mechanism other than a variable valve timing mechanism, such as a motor that is used to drive a mechanism that changes the opening degree of throttle valves of an internal combustion engine, or a motor that is used to drive a mechanism that changes the valve opening period and the maximum lift amount of engine valves, for example.

The present invention may also be applied to motor control systems that execute operation control of a motor other than an electric motor, such as a system that executes operation control of an electric linear motor that has a movable member that moves in a reciprocating manner such as a plunger, and a system that executes operation control of a motor that operates on a fluid pressure such as an oil pressure or an air pressure, for example. In short, the present invention can be applied to any motor control system that includes devices and sensors that output a position signal corresponding to the moved position of a movable member of a motor and a direction signal corresponding to the movement direction of the movable member to execute operation control of the motor.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A malfunction determination device for a motor control system that includes a position signal output section that outputs a position signal that indicates a moved position of a movable member of a motor and a direction signal output section that outputs a direction signal that indicates a movement direction of the movable member to execute operation control of the motor, the malfunction determination device comprising:
   a malfunction determination section that determines a malfunction has occurred if a relationship between the position signal and the direction signal differs from that when no malfunction has occurred in the motor control system,
   wherein:
   the position signal output section outputs a pulse signal that varies periodically along with variations in the moved position of the movable member as the position signal,
   the direction signal output section outputs a periodic pulse signal in the same phase with the position signal as the direction signal if the movable member is moving in one of a forward direction and a reverse direction, and
   the direction signal output section outputs a periodic pulse signal in an opposite phase to the position signal as the direction signal if the movable member is moving in the other of the forward direction and the reverse direction.

2. The malfunction determination device for a motor control system according to claim 1, further comprising:
   a setting section that sets a control target for the movement direction,
   wherein it is determined that the relationship between the position signal and the direction signal is different from that when no malfunction has occurred if the movement direction of the movable member, which is determined based on the position signal and the direction signal, does not match the control target.

3. The malfunction determination device for a motor control system according to claim 2, wherein
   it is determined that the movement direction of the movable member does not match the control target if the control target and the direction signal do not vary along with each other over a specified period during variations in the moved position of the movable member.

4. The malfunction determination device for a motor control system according to claim 1, wherein
the occurrence of a malfunction is determined if a movement speed of the movable member is equal to at least a prescribed speed.

5. The malfunction determination device for a motor control system according to claim 1, wherein
the motor is an electric motor,
the movable member is an output shaft of the motor, and
the moved position is a rotational phase of the output shaft.

6. The malfunction determination device for a motor control system according to claim 5, wherein
the motor control system is applied to a variable valve timing mechanism that varies a rotational speed of the output shaft with respect to a rotational speed of a camshaft of an internal combustion engine through feedback control of the rotational speed of the output shaft and that thus varies a rotational phase of the camshaft with respect to a rotational phase of a crankshaft of the internal combustion engine to vary a valve timing of engine valves.

7. A malfunction determination device for a motor control system that includes position signal output means for outputting a position signal that indicates a moved position of a movable member of a motor and direction signal output means for outputting a direction signal that indicates a movement direction of the movable member to execute operation control of the motor, the malfunction determination device comprising:
malfunction determination means for determining a malfunction has occurred if a relationship between the position signal and the direction signal differs from that when no malfunction has occurred in the motor control system,
wherein:
the position signal output means outputs a pulse signal that varies periodically along with variations in the moved position of the movable member as the position signal,
the direction signal output means outputs a periodic pulse signal in the same phase with the position signal as the direction signal if the movable member is moving in one of a forward direction and a reverse direction, and
the direction signal output means outputs a periodic pulse signal in an opposite phase to the position signal as the direction signal if the movable member is moving in the other of the forward direction and the reverse direction.

8. A malfunction determination method for a motor control system that executes operation control of a motor, the method comprising:
outputting, as a position signal that indicates a moved position of a movable member of the motor, a pulse signal that varies periodically along with variations in the moved position of the movable member;
outputting a periodic pulse signal in the same phase with the position signal as a direction signal that indicates a movement direction of the movable member if the movable member is moving in one of a forward direction and a reverse direction;
outputting a periodic pulse signal in an opposite phase to the position signal as the direction signal that indicates the movement direction of the movable member if the movable member is moving in the other of the forward direction and the reverse direction; and
determining that a malfunction has occurred if a relationship between the position signal and the direction signal differs from that when no malfunction has occurred in the motor control system.

* * * * *